(12) United States Patent
Lin

(10) Patent No.: US 10,698,087 B2
(45) Date of Patent: Jun. 30, 2020

(54) OPTICAL SENSING SYSTEM AND ELECTRONIC DISPLAY SYSTEM

(71) Applicant: SILERGY SEMICONDUCTOR TECHNOLOGY (HANGZHOU) LTD, Zhejiang (CN)

(72) Inventor: Suyi Lin, Zhejiang (CN)

(73) Assignee: SILERGY SEMICONDUCTOR TECHNOLOGY (HANGZHOU) LTD, Hangzhou, Zhejiang (CN)

( * ) Notice: Subject to any disclaimer, the term of this patent is extended or adjusted under 35 U.S.C. 154(b) by 0 days.

(21) Appl. No.: 16/265,903

(22) Filed: Feb. 1, 2019

(65) Prior Publication Data

US 2019/0361095 A1 Nov. 28, 2019

(30) Foreign Application Priority Data

May 25, 2018 (CN) .......................... 2018 1 0515057

(51) Int. Cl.
*G01B 11/14* (2006.01)
*G01S 7/481* (2006.01)
*G01S 17/08* (2006.01)
*F21V 8/00* (2006.01)

(52) U.S. Cl.
CPC ............ *G01S 7/4814* (2013.01); *G01S 17/08* (2013.01); *G02B 6/0036* (2013.01)

(58) Field of Classification Search
CPC ...... G01S 17/026; G01S 17/08; G01S 7/4814; G02B 6/42; H01L 31/16; B02B 6/0018; B02B 6/0031; B02B 6/0036
See application file for complete search history.

(56) References Cited

U.S. PATENT DOCUMENTS

| | | | |
|---|---|---|---|
| 2014/0364218 A1* | 12/2014 | Holmgren | G01S 17/88 463/31 |
| 2018/0260060 A1* | 9/2018 | Zhang | G06K 9/0002 |
| 2019/0041515 A1* | 2/2019 | Haruguchi | G01S 17/08 |
| 2019/0212419 A1* | 7/2019 | Jeong | G01S 17/42 |

* cited by examiner

*Primary Examiner* — Peter B Kim
(74) *Attorney, Agent, or Firm* — Harness, Dickey & Pierce, P.L.C.

(57) ABSTRACT

An optical sensing system and an electronic display system are provided. In the optical sensing system, a light is firstly transmitted to a light guide device via a first light emitting surface and then is transmitted to a light transmissive display screen via a second light emitting surface on the light guide device, and then the light passes through the light transmissive display screen. In this case, even if an area of the first light emitting surface is small due to the small size of an encapsulating body for a light emitting element, energy of the light is not concentrated at a small region of the light transmissive display screen but is dispersed to a relatively large region of the light transmissive display screen, as long as an area of the second light emitting surface is set to be relatively large.

17 Claims, 2 Drawing Sheets

US 10,698,087 B2

OPTICAL SENSING SYSTEM AND ELECTRONIC DISPLAY SYSTEM

CROSS REFERENCE OF RELATED APPLICATION

This application claims the priority to Chinese Patent Application No. 201810515057.3, titled "OPTICAL SENSING SYSTEM AND ELECTRONIC DISPLAY SYSTEM", filed on May 25, 2018 with the Chinese Patent Office, which is incorporated herein by reference in its entirety.

FIELD

The present disclosure relates to the technical field of photoelectric sensing, and in particular to an optical sensing system and an electronic display system.

BACKGROUND

The operation principle of a photoelectric distance sensor is that, an object is illuminated with light emitted by a light source, and light reflected by the object is received and converted into an electrical signal by a photoelectric sensing device. The photoelectric distance sensor is suitable for various daily applications. For example, the photoelectric distance sensor may be used in a mobile phone to detect talking posture of a user.

In order to meet design requirements for full-screen display devices, a light transmissive display screen is usually adopted, and the photoelectric distance sensor is arranged under the light transmissive display screen to perform distance sensing. In the conventional technology, an optical sensing system including a light transmissive display screen is shown in FIG. 1. The optical sensing system mainly includes a light emitting element 101, a light sensing element 102, and a light transmissive display screen 104. The light emitting element 101 and the light sensing element 102 are arranged on a substrate 105, and are encapsulated in an encapsulating body 106. A light emitting surface A and a light receiving surface B are provided on a surface of the encapsulating body. The light EL is emitted by the light emitting element 101 to outside of the encapsulating body 106 via the light emitting surface A and is transmitted to the light transmissive display screen 104. Then, the light transmitted to the light transmissive display screen 104 is transmitted to a to-be-detected object 103, and is reflected by the to-be-detected object 103 to form the reflecting light RL. The reflected light RL passes through the light transmissive display screen 104, and reaches the light sensing element 102 via the light receiving surface B. The light sensing element 102 receives the reflected light RL and performs distance sensing on the to-be-detected object based on the intensity of the reflected light RL.

In the above conventional optical sensing system, the volume of the encapsulating body are required to be relatively small due to the high manufacturing cost, which results in the small light emitting surface. In this case, the energy of the light emitted from the light emitting surface is mostly concentrated at a small region (as indicated by a region surrounded by dotted lines in FIG. 1) of the light transmissive display screen, easily causing light spot phenomenon on the light transmissive display screen.

SUMMARY

In view of above, an optical sensing system and an electronic display system are provided in the present disclosure, to solve the problem of light spot on a light transmissive display screen due to concentration of light energy, and decrease a size of an encapsulating body for a light emitting element in an optical sensing system.

An optical sensing system is provided in the present disclosure. The optical sensing system includes: a light emitting element, a light guide device including a second light emitting surface, and a light sensing element, where a first light emitting surface is provided on a surface of a first structure encapsulating the light emitting element, and a light receiving surface is provided on a surface of a second structure encapsulating the light sensing element, where a light is emitted by the light emitting element via the first light emitting surface and is transmitted to the light guide device;

the light transmitted to the light guide device is emitted to a to-be-detected object via the second light emitting surface and is reflected by the to-be-detected object to form reflected light;

the reflected light reaches the light sensing element via the light receiving surface, where the light sensing element is configured to receive the reflected light, and perform distance sensing on the to-be-detected object based on an intensity of the reflected light; and an area occupied by light transmitted from the second light emitting surface is larger than an area occupied by light transmitted from the first light emitting surface.

In an embodiment, the light emitting element, the light guide device and the light sensing element are located under a light transmissive display screen;

the light emitted from the second light emitting surface is transmitted to the to-be-detected object after passing through the light transmissive display screen; and the reflected light is received by the light sensing element after passing through the light transmissive display screen.

In an embodiment, the light guide device is a uniform light guide device, and the light emitted by the light emitting element uniformly passes through the light transmissive display screen after passing through the light guide device.

In an embodiment, a light emitting region of the second light emitting surface is larger than a light emitting region of the first light emitting surface.

In an embodiment, an area of the second light emitting surface is at least five times of an area of the first light emitting surface.

In an embodiment, the first light emitting surface is parallel to the light receiving surface.

In an embodiment, the first light emitting surface and the light receiving surface are arranged on a same plate.

In an embodiment, the light emitting element is encapsulated in a first encapsulating body, with the first structure being a part of the first encapsulating body, and The light sensing element is encapsulated in a second encapsulating body, with the second structure being a part of the second encapsulating body.

In an embodiment, the light sensing element and the light emitting element are encapsulated in an encapsulating body, a light shielding element is provided between the light emitting element and the light sensing element in the encapsulating body, the light receiving surface is arranged on a surface of the encapsulating body, with the light receiving surface being arranged in parallel to the second light emitting surface, and the reflected light is received by the light sensing element via the light receiving surface.

In an embodiment, the first light emitting surface and the light receiving surface are arranged on different surfaces of the encapsulating body.

In an embodiment, the first light emitting surface is not parallel to the light receiving surface.

In an embodiment, an angle between the first light emitting surface and the light receiving surface is not less than 90 degrees.

In an embodiment, a distance between light emitted via the first light emitting surface and light passing through the light receiving surface is a first distance, and a distance between light emitted via the second light emitting surface and light passing through the light receiving surface is a second distance, where the second distance is greater than the first distance.

In an embodiment, the light guide device includes a first surface and a second surface opposite to each other, where the first surface is closer to the to-be-detected object than the second surface; and the second light emitting surface is arranged on the first surface.

In an embodiment, a light guide structure is provided on the second surface to guide the light transmitted to the light guide device to be emitted from the second light emitting surface.

In an embodiment, the light guide structure is made of a light diffusion material adhered to the second surface.

In an embodiment, the light guide structure is a micro structure protruding from the second surface.

In an embodiment, the light guide device is configured to decrease energy of the light emitted from the second light emitting surface outwardly from a central region when passing through the light transmissive display screen.

An electronic display system is further provided in the present disclosure. The electronic display system includes a light transmissive display screen and the optical sensing system described above. The optical sensing system is located under the light transmissive display screen and is configured to perform distance sensing.

It can be seen from the above, according to the optical sensing system and the electronic display system provided in the present disclosure, the light emitted from the first light emitting surface is firstly transmitted to the light guide device and is emitted via the second light emitting surface of the light guide device, and then passes through the light transmissive display screen. In this case, even if the area of the first light emitting surface is small due to the small size of the encapsulating body, the energy of the light is not concentrated at a small region of the light transmissive display screen but is dispersed to a relatively large region of the light transmissive display screen, as long as the area of the second light emitting surface is set to be relatively large. Therefore, with the optical sensing system according to the first embodiment, the light spot on the light transmissive display screen can be avoided, and the size of the encapsulating body for the light emitting element can be small.

BRIEF DESCRIPTION OF THE DRAWINGS

The above and other objects, features and advantages of the present disclosure are apparent from the following description given in conjunction with the drawings.

DETAILED DESCRIPTION OF EMBODIMENTS

Figure 1:
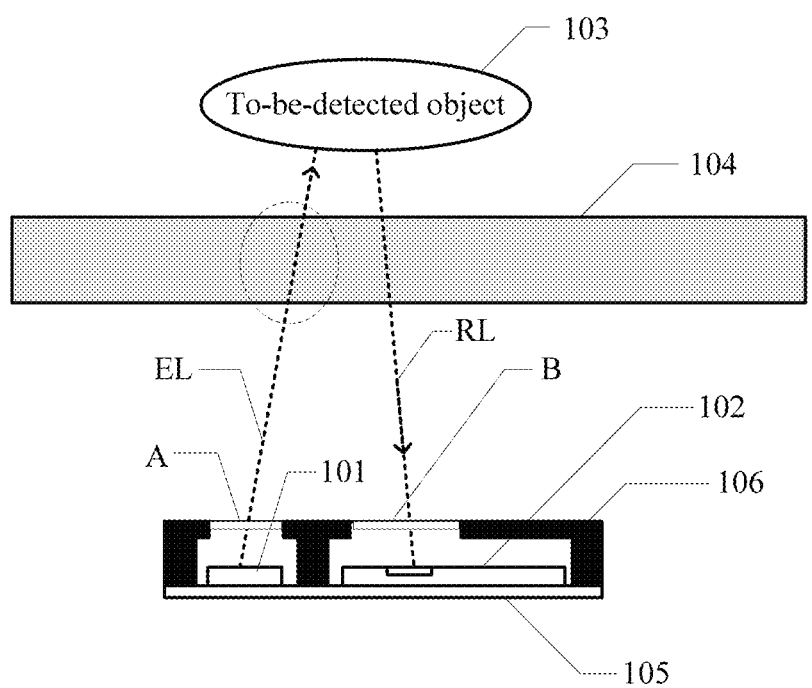
FIG. 1 is a schematic diagram of an optical sensing system in the conventional technology.

The present disclosure is described in detail with reference to the drawings. In the drawings, the same component is indicated by similar reference numerals. For the sake of clarity, the drawings are not drawn to scale, and some well-known portions may not be shown. For the sake of brevity, a structure obtained after some steps are performed may be shown in a drawing. Specific details of the present disclosure are described below, such as device structures, materials, dimensions, processes and techniques, so as to understand the present disclosure more clearly. The present disclosure may be implemented without the specific details, as those skilled in the art can understand.

Figure 2:
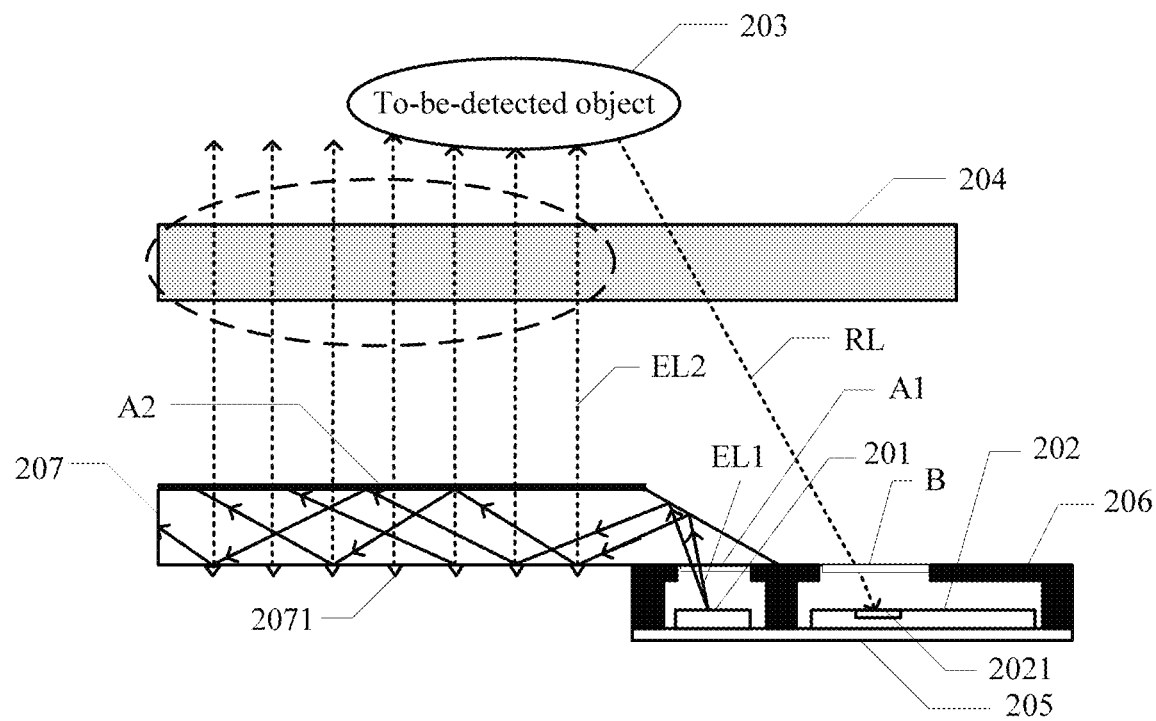
FIG. 2 is a schematic diagram of an optical sensing system according to a first embodiment of the present disclosure.

FIG. 2 is a schematic diagram of an optical sensing system according to a first embodiment of the present disclosure. As shown in FIG. 2, the optical sensing system includes a light emitting element 201, a light guide device 207, and a light sensing element 202. A light EL1 is emitted by the light emitting element 201 via a first light emitting surface A1 and is transmitted to the light guide device 207, where the first light emitting surface A1 is located on a surface of a first structure encapsulating the light emitting element 201. The light guide device 207 includes a second light emitting surface A2. The light EL1 transmitted to the light guide device 207 is emitted via the second light emitting surface A2 to form light EL2. The light EL2 emitted from the second light emitting surface A2 is reflected by a to-be-detected object 103 to form reflected light RL, the reflected light RL reaches the light sensing element 202 via a light receiving surface B, where the light receiving surface B is located on a surface of a second structure encapsulating the light sensing element 202. In this embodiment, since the light emitting element 201 and the light sensing element 202 are encapsulated in a same encapsulating body 206, each of the first structure and the second structure is a part of the encapsulating body 206. In other embodiments, the light emitting element 201 maybe encapsulated in a first encapsulating body, and the light sensing element 202 may be encapsulated in a second encapsulating body, where the first light emitting surface A1 is located on a surface of the first encapsulating body, the light receiving surface B is located on a surface of the second encapsulating body, and the first encapsulating body and the second encapsulating body are different encapsulating bodies. The light sensing element 202 is used to receive the reflected light RL and perform distance sensing on the to-be-detected object based on an intensity of the reflected light RL. A light emitting region (a region from which the light EL2 is emitted) of the second light emitting surface A2 is larger than a light emitting region (a region from which the light EL1 is emitted) of the first light emitting surface A1, that is, the area occupied by light transmitted from the second light emitting surface is larger than the area occupied by light transmitted from the first light emitting surface.

As shown in FIG. 2, in the optical sensing system according to the first embodiment, the light emitting element 201 is encapsulated in the encapsulating body 206, and the first light emitting surface A1 is arranged on a surface of the encapsulating body 206. In addition, in the first embodiment, the light sensing element 202 is encapsulated in the encapsulating body 206 together with the light emitting element 201, the light receiving surface B is arranged on a surface of the encapsulating body, and the light emitting surface A1 and the light receiving surface B are located on a same surface of the encapsulating body 206. That is, the light emitting surface A1 and the light receiving surface B are coplanar with each other. Further, the second light emitting surface A2 is required to be arranged in parallel to the light receiving surface B. In the encapsulating body 206, a circuit substrate 205 is further provided. The light emitting element 201 and the light sensing element 202 are electrically connected to the circuit substrate 205, and a light shielding cover (which is not shown in FIG. 2) is configured to cover the circuit substrate 205, and expose only the first light emitting surface A1 and the light receiving surface B. Further, a light shielding element (which is not shown in FIG. 2) is arranged between the light emitting element 201 and the light sensing element 202, to prevent the light emitted by the light emitting element 201 from affecting the distance sensing performed by the light sensing element 202. A light receiving element 2021 such as a photodiode is provided on a surface of the light sensing element 202. The reflected light RL is received by the light receiving element 2021, and a photoelectric conversion circuit in the light sensing element converts the received reflected light into an electrical signal to be outputted, so as to obtain a distance sensing signal for the to-be-detected object 203.

In addition, the optical sensing system according to the first embodiment further includes a light transmissive display screen 204. The light transmissive display screen 204 is located above the light emitting element 201, the light guide device 207, and the light sensing element 202. The light EL2 emitted from the second light emitting surface is firstly transmitted to the light transmissive display screen 204. Then, the light EL2 is transmitted to the to-be-detected object 203 after passing through the light transmissive display screen 204. Further, the reflected light RL reflected by the to-be-detected object 203 is firstly reflected to the light transmissive display screen 204, and is received by the light sensing element 202 after passing through the light transmissive display screen 204.

In the optical sensing system according to the first embodiment, the light emitted via the first light emitting surface A1 is firstly transmitted to the light guide device 207 and is emitted via the second light emitting surface A2 on the light guide device 207, and then passes through the light transmissive display screen 204. In this case, even if the area of the first light emitting surface is small due to the small size of the encapsulating body, the energy of the light is not concentrated at a small region of the light transmissive display screen 204 but is dispersed to a relatively large region of the light transmissive display screen 204, as long as the area of the second light emitting surface is set to be relatively large, as indicated by a region surrounded by dotted lines in FIG. 2. Therefore, with the optical sensing system according to the first embodiment, the light spot on the light transmissive display screen can be avoided, and the size of the encapsulating body for the light emitting element can be set relatively small.

In the first embodiment, the light emitting element 201 and the light sensing element 202 are encapsulated in the encapsulating body 206, and the first light emitting surface A1 and the light receiving surface B are located on a first surface of the encapsulating body 206. In this case, the light guide device 207 is required to be arranged above the first surface of the encapsulating body 206, and the light guide device 207 is required to cover the first light emitting surface A1 (in a contact manner or in a non-contact manner) but not block the light receiving surface B. In a case that the light guide device 207 covers the first light emitting surface A1 in the contact manner, the light guide device is in contact with the first light emitting surface. In addition, in a case that the light guide device 207 covers the first light emitting surface A1 in the non-contact manner, the light guide device is not in direct contact with the first light emitting surface. The light guide device 207 has a first surface (one surface of the light guide device closer to the light transmissive display screen 204 than the other) and a second surface opposite to each other. The second light emitting surface A2 is located on the first surface of the light guide device 207, in a case that the first surface of the light guide device 207 is the second light emitting surface A2. A part of the second surface of the light guide device 207 covers the first light emitting surface A1, and the remaining part of the second surface is provided with a light guide structure 2071. The light guide structure 2071 is used to guide the light transmitted to the light guide device 207 to be emitted from the second light emitting surface A2. In this embodiment, the light guide structure 2071 is a micro structure protruding from the second surface of the light guide device 207. The micro structure is made of the same material as the light guide device 207 and is only a tiny structure protruding from the second surface of the light guide device 207. In other embodiments, the light guide structure 2071 may also be implemented by a light diffusing material adhered to the second surface of the light guide device 207, such as an ink or a light emitting sheet.

The light guide device 207 may be a uniform light guide device, via which the light is uniformly emitted via the second light emitting surface A2 and uniformly passes through the light transmissive display screen 204. The uniform light guide device can be realized by setting the light guide structures 2071 with uniform spacing. In this case, the light energy is uniformly distributed on the light transmissive display screen 204, not causing light spot on the display screen. In addition, in other embodiments, the energy distribution of the light EL2 emitted via the second light emitting surface A2 may be changed by means of the light guide structure 2071 of the light guide device 207, the distance between the light guide structures is set to increase gradually outward from the central region, so that the energy of the light EL2 is decreased outward from a central region when passing through the light transmissive display screen 204, and thus the boundary formed for a long time is blurred.

In addition, a distance between the light EL1 emitted via the first light emitting surface A1 and the reflected light RL is a first distance, and a distance between the light EL2 emitted via the second light emitting surface A2 and the reflected light RL is a second distance. The second distance is greater than the first distance due to the setting of the light guide device 207. Since the light EL2 emitted via the second light emitting surface A2 is actual emitted light in the optical sensing system according to the first embodiment, the second distance between the light EL2 and the reflected light RL is not decreased with the deceasing of the size of the encapsulating body 206. In this way, mutual crosstalk between the emitted light and the reflected light can be avoided in the case that the size of the encapsulating body 206 is small, thereby improving the sensing accuracy of the optical sensing system. Further, since an actual light emitting surface (via which the light is finally emitted to the light transmissive display screen) of the optical sensing system is the second light emitting surface A2 according to the first embodiment, so that the area of the first light emitting surface A1 is not required to be large. In this way, in the encapsulating body 206, the area of the first light emitting surface A1 can be set to be relatively small, and the area of the light receiving surface B can be set to be relatively large, so as to effectively reduce the energy density.

In order to cause the light finally emitted by the optical sensing system according to the first embodiment to uniformly pass through the light transmissive display screen 204 in a large area, the area of the second light emitting surface A2 is required to be set large. For example, the area of the second light emitting surface A2 may be at least five times of the area of the first light emitting surface A1.

Figure 3:
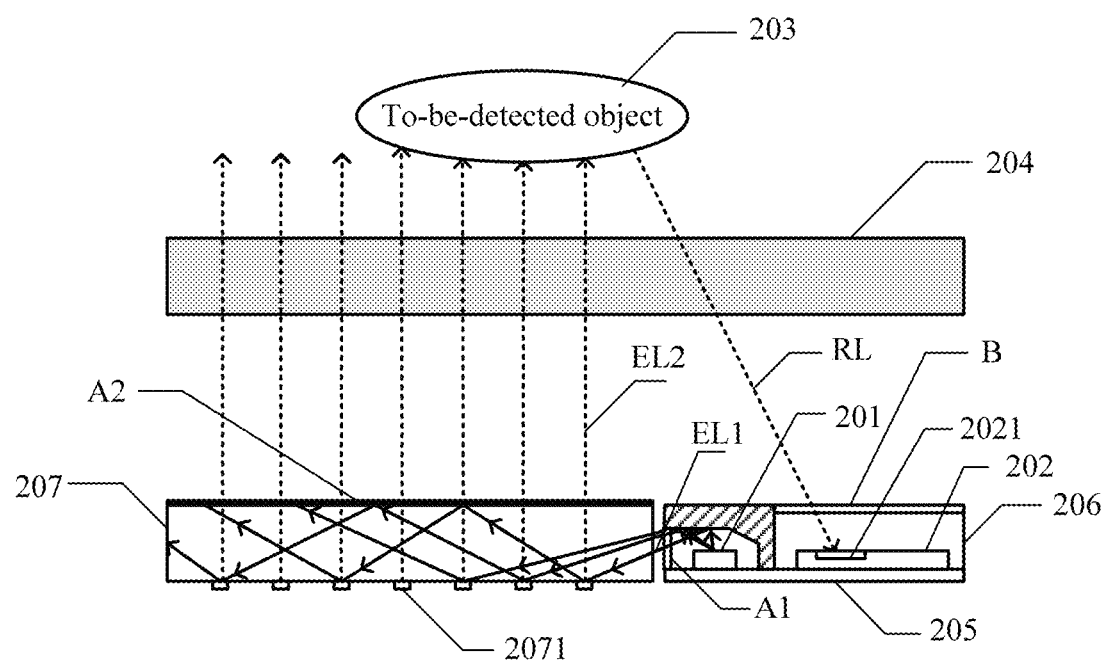
FIG. 3 is a schematic diagram of an optical sensing system according to a second embodiment of the present disclosure.

FIG. 3 is a schematic diagram of an optical sensing system according to a second embodiment of the present disclosure. The second embodiment differs from the first embodiment mainly in the encapsulating manner for the light emitting element 201 and the light sensing element 202, and the light guide structure 2071 of the light guide device 207, which are illustrated in detail below.

In the second embodiment, the light emitting element 201 and the light sensing element 202 are still encapsulated in an encapsulating body 206. The first light emitting surface A1 and the light receiving surface B are located on different surfaces of the encapsulating body 206, rather than on a same surface of the encapsulating body 206. The first light emitting surface A1 is arranged in nonparallel to the light receiving surface B. An angle between the first light emitting surface and the light receiving surface is not less than 90 degrees, and is preferably not greater than 150 degrees. In the second embodiment, the first light emitting surface A1 is located on a side surface of the encapsulating body 206, and the light receiving surface B is located on a top surface (a surface that is parallel to the light transmissive display screen and is closer to the light transmissive display screen) of the encapsulating body 206. The side surface is perpendicular to the top surface, that is, the angle between the first light emitting surface A1 and the light receiving surface B is 90 degrees. In order to cause the light emitted by the light emitting element 201 to be emitted from the side surface of the encapsulating body 206, a light reflecting material is arranged above the light emitting element 201 and at a side surface of opposite to the first light emitting surface A1.

Further, in the second embodiment, the light guide device 207 is arranged on a side surface of the encapsulating body 206 for the light emitting element 201 and is adjacent to the first light emitting surface A1. The light EL1 emitted via the first light emitting surface A1 is transmitted to the light guide device 207 via a side surface (a surface that is adjacent to the first light emitting surface A1) of the light guide device 207, then is transmitted to the second light emitting surface A2 of the light guide device 207 by means of the light guide structure 2071. In this embodiment, the light guide structure 2071 is implemented by a light diffusing material adhered to the second surface of the light guide device 207, such as an ink or a reflecting plate.

In the second embodiment, since the second light emitting surface functions as an actual light emitting surface of the optical sensing system, the area of the first light emitting surface is not required to be large. Further, the first light emitting surface is arranged on the side surface of the encapsulating body, so that the area of the light receiving surface arranged on the top surface of the encapsulating body can be set to be relatively large, thereby further improving the performance of the optical sensing system.

In addition, an electronic display system such as a mobile phone display system, a tablet display system is further provided in the present disclosure. The electronic display system includes the optical sensing system provided in the present disclosure and a light transmissive display screen. The optical sensing system is arranged under the light transmissive display screen to perform distance sensing.

Embodiments in the present disclosure are described as above, and not all details are described in detail in the embodiments. The present disclosure is not limited to the specific embodiments. It is apparent that various modifications and variations may be made based on the above description. The embodiments are selected and described in detail in this specification, to explain the principles and practical applications of the present disclosure, so that those skilled in the art can make good use of the present disclosure and the modifications based on the present disclosure. The present disclosure is limited only by the claims and the full scope and equivalents thereof.

The invention claimed is:

1. An optical sensing system, comprising: a light emitting element, wherein a first light emitting surface is provided on a surface of a first structure encapsulating the light emitting element; a light guide device comprising a first surface and a second surface opposite to each other, wherein the first surface is closer to a to-be-detected object than the second surface, a second light emitting surface is arranged on the first surface, and a light guide structure is provided on the second surface; and a light sensing element, wherein a light receiving surface is provided on a surface of a second structure encapsulating the light sensing element, wherein a light is emitted by the light emitting element via the first light emitting surface and is transmitted to the light guide device; the light transmitted to the light guide device is emitted to the to-be-detected object via the second light emitting surface and is reflected by the to-be-detected object to form reflected light, wherein the light guide structure is configured to guide the light transmitted to the light guide device to be emitted from the second light emitting surface; the reflected light reaches the light sensing element via the light receiving surface, wherein the light sensing element is configured to receive the reflected light, and perform distance sensing on the to-be-detected object based on an intensity of the reflected light; and an area occupied by light transmitted from the second light emitting surface is larger than an area occupied by light transmitted from the first light emitting surface.

2. The optical sensing system according to claim 1, wherein the light emitting element, the light guide device and the light sensing element are located under a light transmissive display screen,
   the light emitted from the second light emitting surface is transmitted to the to-be-detected object after passing through the light transmissive display screen; and
   the reflected light is received by the light sensing element after passing through the light transmissive display screen.

3. The optical sensing system according to claim 2, wherein the light guide device is a uniform light guide device, and the light emitted by the light emitting element uniformly passes through the light transmissive display screen after passing through the light guide device.

4. The optical sensing system according to claim 2, wherein the light guide device is configured to decrease energy of the light emitted from the second light emitting surface outwardly from a central region when passing through the light transmissive display screen.

5. The optical sensing system according to claim 1, wherein a light emitting region of the second light emitting surface is larger than a light emitting region of the first light emitting surface.

6. The optical sensing system according to claim 5, wherein an area of the second light emitting surface is at least five times of an area of the first light emitting surface.

7. The optical sensing system according to claim 1, wherein the first light emitting surface is parallel to the light receiving surface.

8. The optical sensing system according to claim 7, wherein the first light emitting surface and the light receiving surface are arranged on a same plate.

9. The optical sensing system according to claim 1, wherein
the light emitting element is encapsulated in a first encapsulating body, with the first structure being a part of the first encapsulating body, and
the light sensing element is encapsulated in a second encapsulating body, with the second structure being a part of the second encapsulating body.

10. The optical sensing system according to claim 1, wherein the light sensing element and the light emitting element are encapsulated in an encapsulating body,
a light shielding element is provided between the light emitting element and the light sensing element in the encapsulating body,
the light receiving surface is arranged on a surface of the encapsulating body, with the light receiving surface being arranged in parallel to the second light emitting surface, and
the reflected light is received by the light sensing element via the light receiving surface.

11. The optical sensing system according to claim 10, wherein the first light emitting surface and the light receiving surface are arranged on different surfaces of the encapsulating body.

12. The optical sensing system according to claim 1, wherein the first light emitting surface is not parallel to the light receiving surface.

13. The optical sensing system according to claim 12, wherein an angle between the first light emitting surface and the light receiving surface is not less than 90 degrees.

14. The optical sensing system according to claim 1, wherein a distance between light emitted via the first light emitting surface and light passing through the light receiving surface is a first distance, and a distance between light emitted via the second light emitting surface and light passing through the light receiving surface is a second distance, wherein the second distance is greater than the first distance.

15. The optical sensing system according to claim 1, wherein the light guide structure is made of a light diffusion material adhered to the second surface.

16. The optical sensing system according to claim 1, wherein the light guide structure is a micro structure protruding from the second surface.

17. An electronic display system, comprising:
a light transmissive display screen; and
the optical sensing system according to claim 1, wherein the optical sensing system is located under the light transmissive display screen and is configured to perform distance sensing.

* * * * *